(12) United States Patent
Carolan

(10) Patent No.: US 8,172,972 B2
(45) Date of Patent: May 8, 2012

(54) PANEL

(75) Inventor: James Carolan, County Cavan (IE)

(73) Assignee: Kingspan Research and Developments Limited, County Cavan (IE)

( * ) Notice: Subject to any disclaimer, the term of this patent is extended or adjusted under 35 U.S.C. 154(b) by 0 days.

(21) Appl. No.: 13/209,815

(22) Filed: Aug. 15, 2011

(65) Prior Publication Data

US 2011/0297297 A1 Dec. 8, 2011

Related U.S. Application Data

(63) Continuation of application No. 12/076,191, filed on Mar. 14, 2008, now Pat. No. 8,028,483.

(30) Foreign Application Priority Data

May 1, 2007 (IE) .................................... 2007/0324
Jun. 21, 2007 (IE) .................................... 2007/0446

(51) Int. Cl.
*B29C 44/12* (2006.01)
*B29C 44/32* (2006.01)

(52) U.S. Cl. .......................... 156/78; 264/46.5; 264/46.7

(58) Field of Classification Search .................... 156/78, 156/79; 264/46.2, 46.5, 46.7
See application file for complete search history.

(56) References Cited

U.S. PATENT DOCUMENTS

| | | | |
|---|---|---|---|
| 2,975,559 A | 3/1961 | Arthur | |
| 3,399,503 A | 9/1968 | Clifford | |
| 3,466,831 A | 9/1969 | Lenoir | |
| 3,482,367 A | 12/1969 | Curran | |
| 3,679,531 A | 7/1972 | Wienand et al. | |
| 3,690,987 A * | 9/1972 | Curran et al. | 156/257 |
| 3,733,232 A | 5/1973 | Payne | |
| 4,062,346 A | 12/1977 | Rapp, Jr. et al. | |
| 4,405,396 A | 9/1983 | Brill-Edwards | |
| 4,475,327 A | 10/1984 | O'Regan et al. | |
| 4,774,932 A | 10/1988 | Hollick | |
| 4,899,728 A | 2/1990 | Peter et al. | |
| 4,934,338 A | 6/1990 | Hollick et al. | |
| 5,186,160 A | 2/1993 | Klein, II | |
| 5,692,491 A | 12/1997 | Christensen et al. | |
| 5,927,032 A | 7/1999 | Record | |
| 5,931,157 A | 8/1999 | Aschauer | |
| 5,935,343 A | 8/1999 | Hollick | |

(Continued)

FOREIGN PATENT DOCUMENTS

CA 1 196 825 11/1985

(Continued)

OTHER PUBLICATIONS

UK Search Report dated Jul. 9, 2008.

(Continued)

*Primary Examiner* — Michael Tolin
(74) *Attorney, Agent, or Firm* — Jacobson Holman PLLC

(57) ABSTRACT

An insulating panel 1 comprises a first sheet 2, a second sheet 4, and a body of insulating foam 5 between the sheets 2, 4. The foam 5 has a plurality of longitudinally extending conduits 7 through which a heat exchange medium such as air is circulated. A barrier 10 is used to create an enlarged void space for air circulation. The barrier is located below profile crowns 3 to prevent foam from entering the crowns 3 and to create additional foam-free voids below the crown. Heat transfer efficiency is increased.

15 Claims, 18 Drawing Sheets

U.S. PATENT DOCUMENTS

| | | |
|---|---|---|
| 6,196,216 B1 | 3/2001 | Kooij |
| 6,944,997 B2 | 9/2005 | Verkamp |
| 7,032,588 B2 | 4/2006 | Hollick |
| 2005/0146068 A1 | 7/2005 | Liu .................................. 264/51 |

FOREIGN PATENT DOCUMENTS

| | | |
|---|---|---|
| DE | 1274320 | 8/1968 |
| DE | 26 13 239 | 10/1977 |
| DE | 30 40 844 | 6/1982 |
| DE | 31 21 849 | 12/1982 |
| DE | 29 33 953 | 3/1984 |
| DE | 36 38 615 | 5/1988 |
| DE | 36 43 668 | 5/1988 |
| DE | 37 22 017 | 8/1988 |
| DE | 90 11 542 | 10/1990 |
| DE | 39 32 972 | 4/1991 |
| DE | 94 19 045 | 2/1995 |
| DE | 29512166 | 11/1995 |
| DE | 203 08 205 | 10/2003 |
| EP | 1738889 | 1/2007 |
| FR | 2 486 983 | 1/1982 |
| GB | 0002009 | 0/1915 |
| GB | 1060924 | 3/1967 |
| GB | 1 327 533 | 8/1973 |
| GB | 1 418 487 | 12/1975 |
| GB | 1 521 637 | 8/1978 |
| GB | 2 044 316 | 10/1980 |
| GB | 2 091 311 | 7/1982 |
| GB | 0 187 356 | 7/1986 |
| GB | 0 278 489 | 8/1988 |
| GB | 2 227 712 | 8/1990 |
| GB | 2 257 086 | 1/1993 |
| GB | 2 298 705 | 9/1996 |
| GB | 0 740 764 | 11/1996 |
| GB | 2 325 640 | 12/1998 |
| GB | 0 976 886 | 2/2000 |
| GB | 2355957 | 5/2001 |
| GB | 2 391 875 | 2/2004 |
| GB | 2 439 191 A | 12/2007 |
| JP | 6235256 | 2/1993 |
| JP | 09013577 | 1/1997 |
| NP | 9200536 | 10/1993 |
| WO | WO 81/01816 | 7/1981 |
| WO | WO 00/77459 | 12/2000 |
| WO | 02/092932 | 11/2002 |
| WO | WO 03/048655 | 6/2003 |
| WO | WO 2004/090255 | 10/2004 |
| WO | WO 2006/102891 | 10/2006 |
| WO | WO 2007/009504 | 1/2007 |
| WO | WO 2007/144863 A1 * | 12/2007 |

OTHER PUBLICATIONS

Kingspan EnergiPanel Brochure (http://www.kingspanpanels.com/Resource_Centre/Literature/Downlaod/Product-Information/Kingspan-Energipanel-Brochure.aspx>).

* cited by examiner

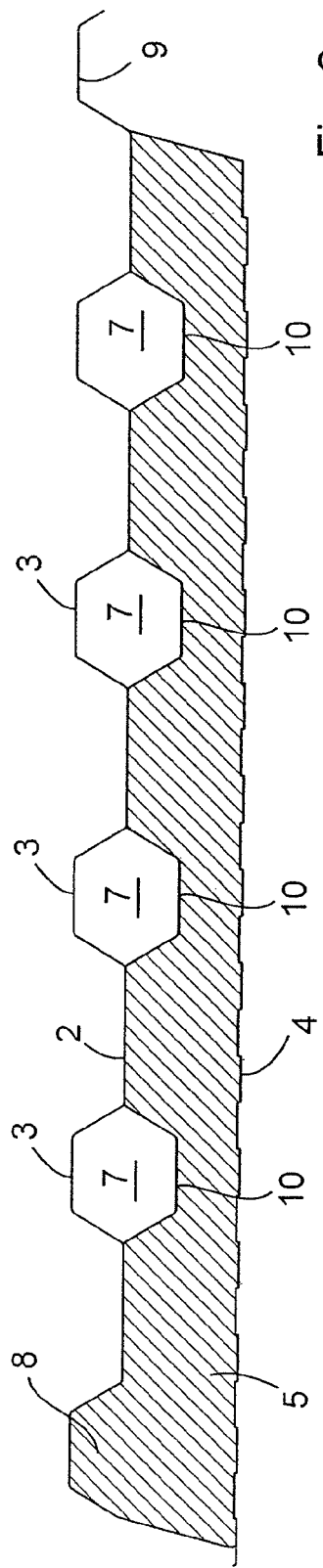
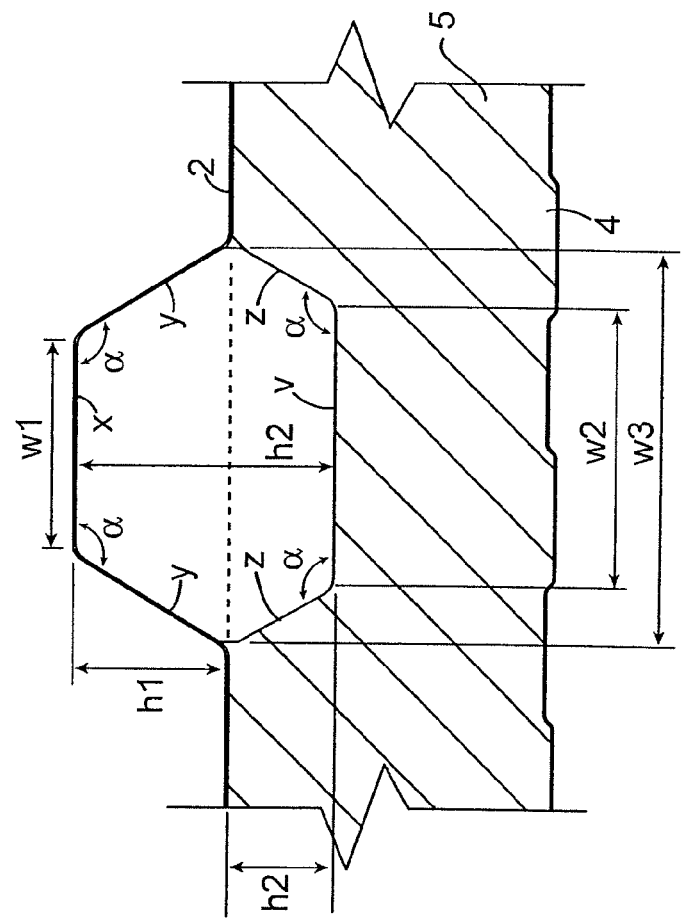
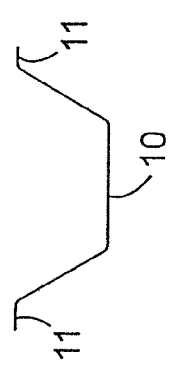
Fig. 2
Fig. 2(b)
Fig. 2(a)

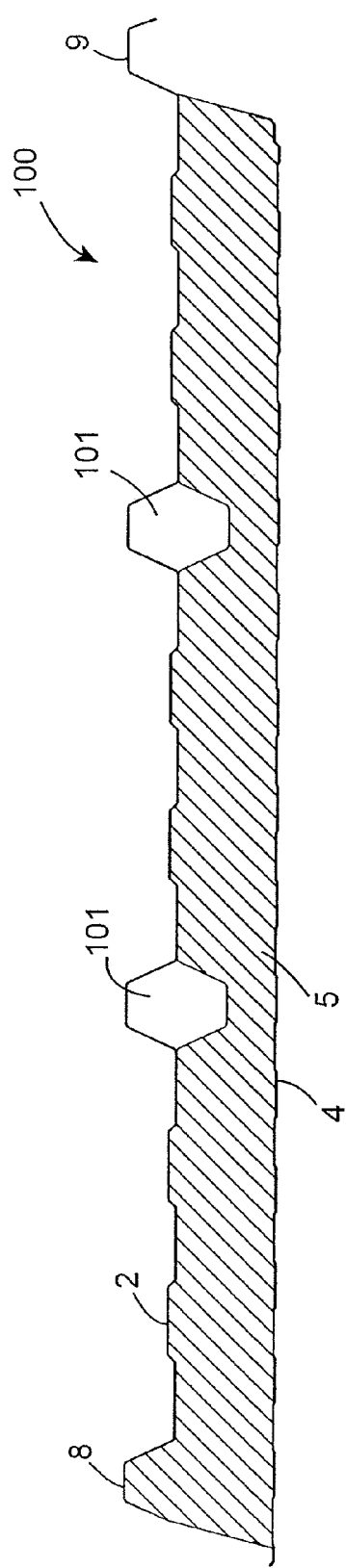
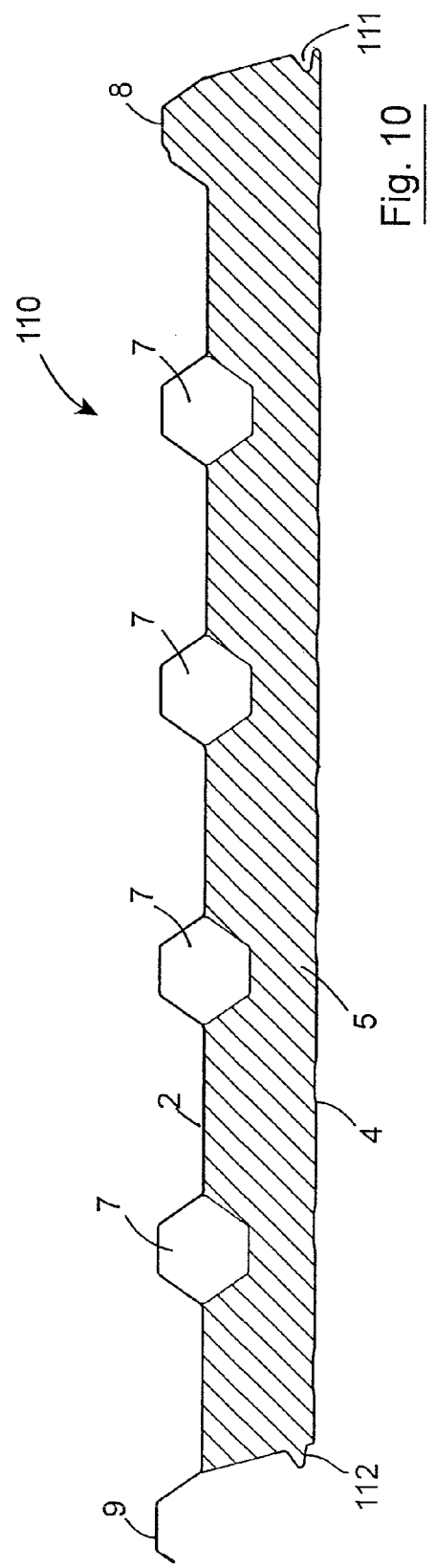

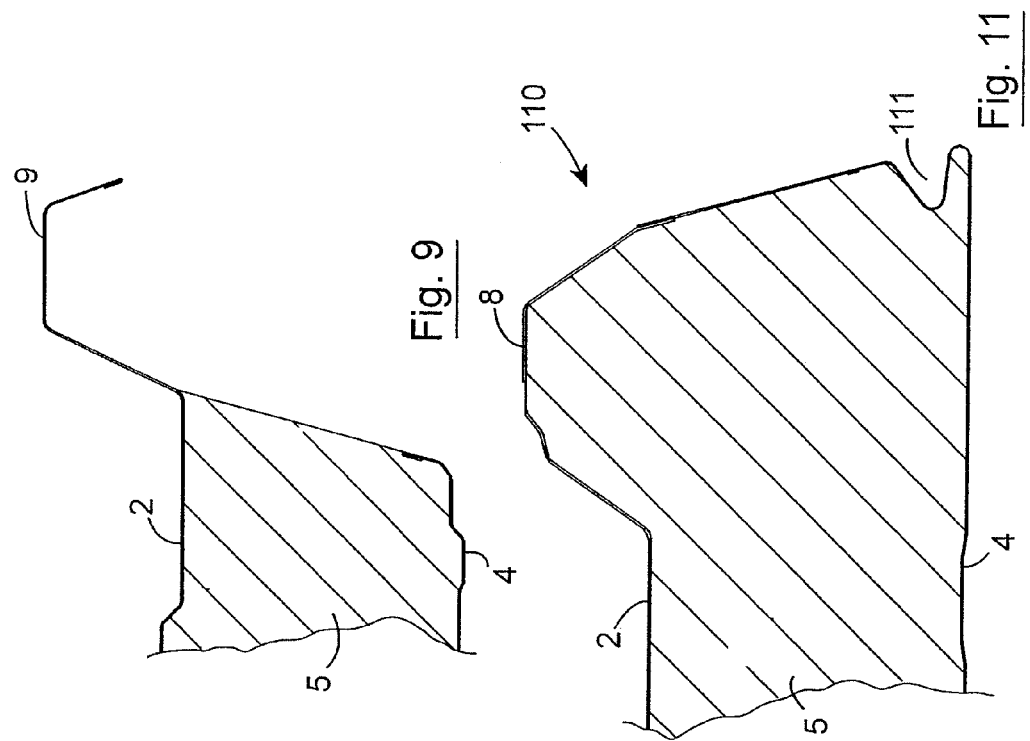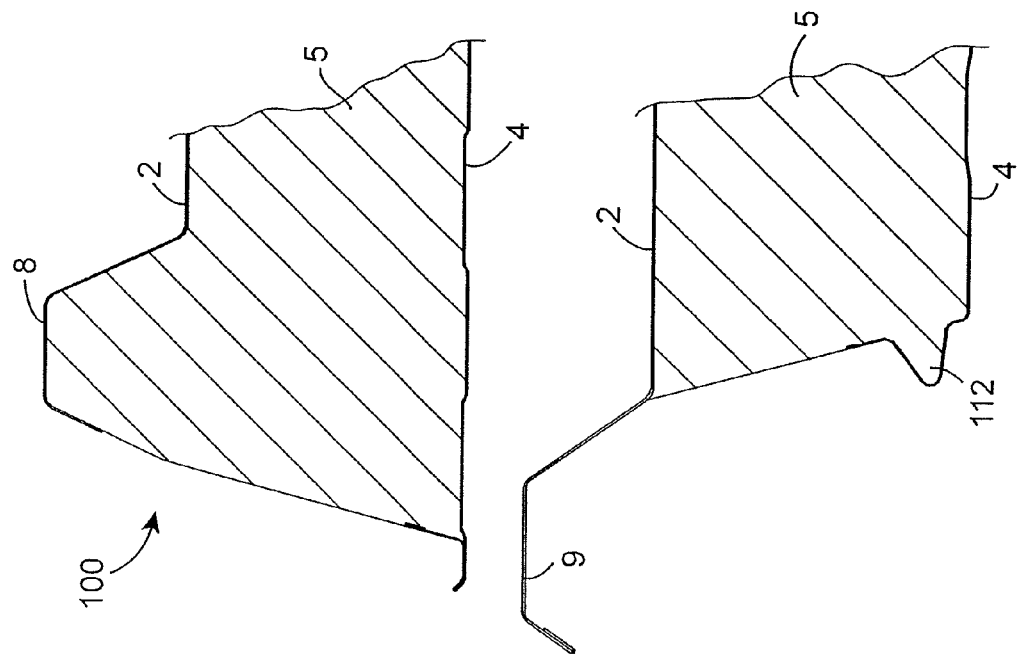

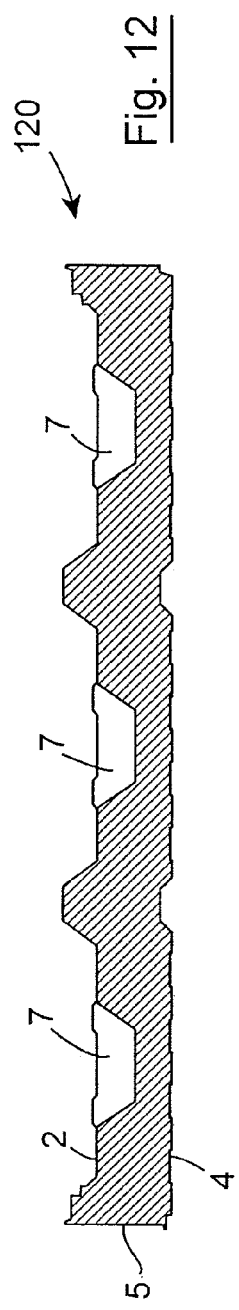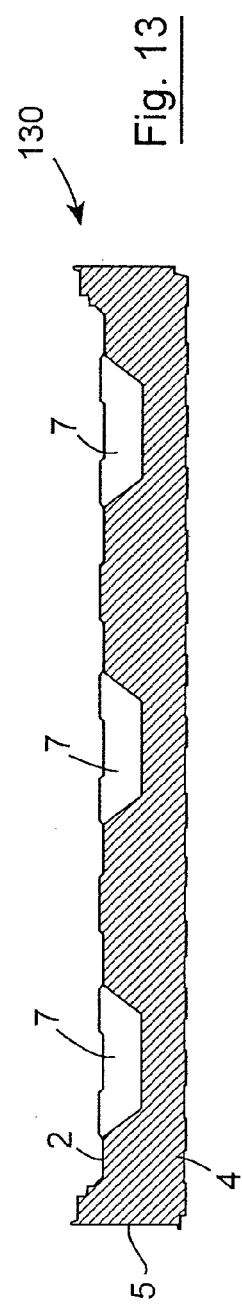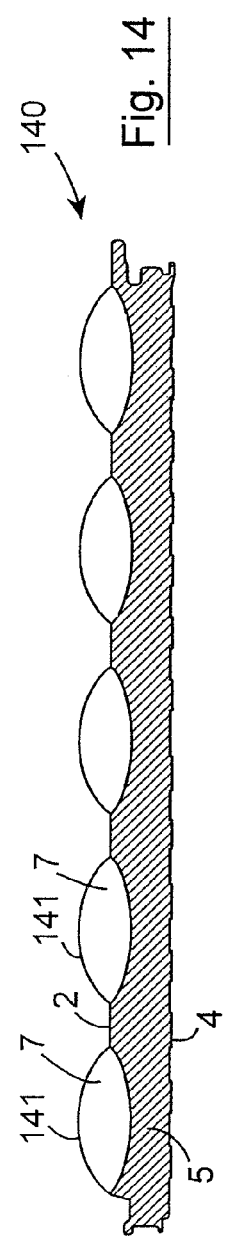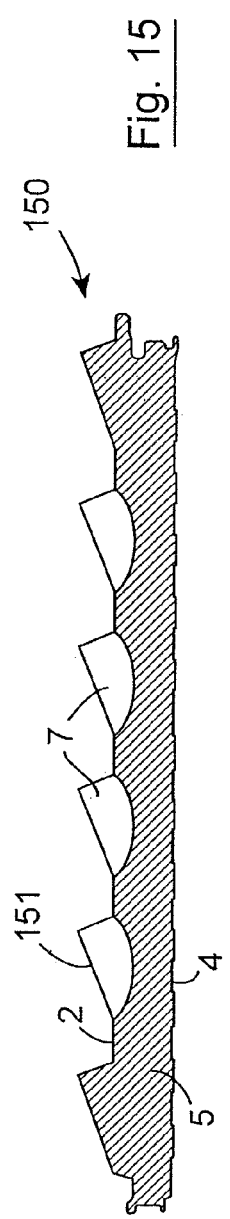

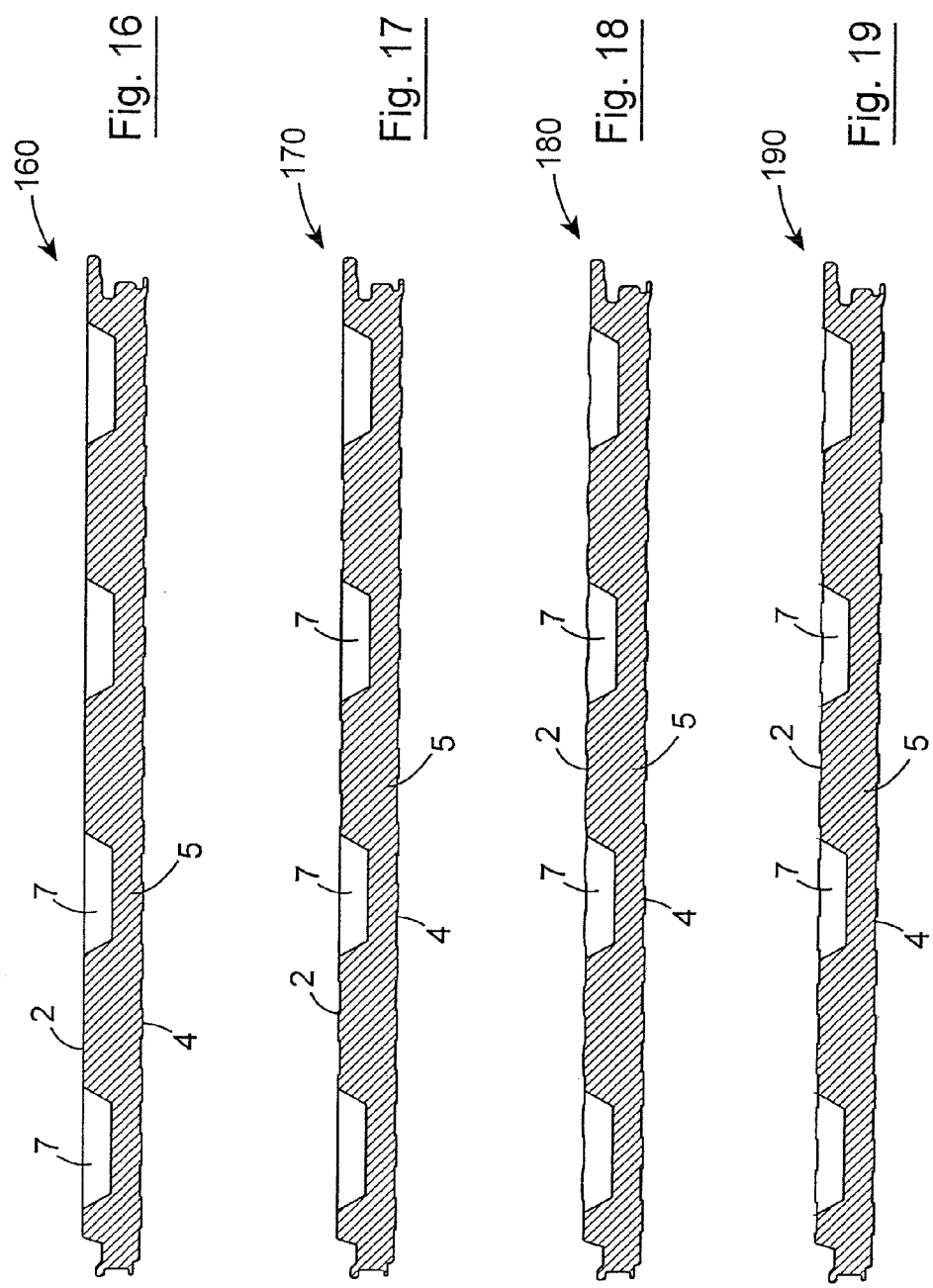

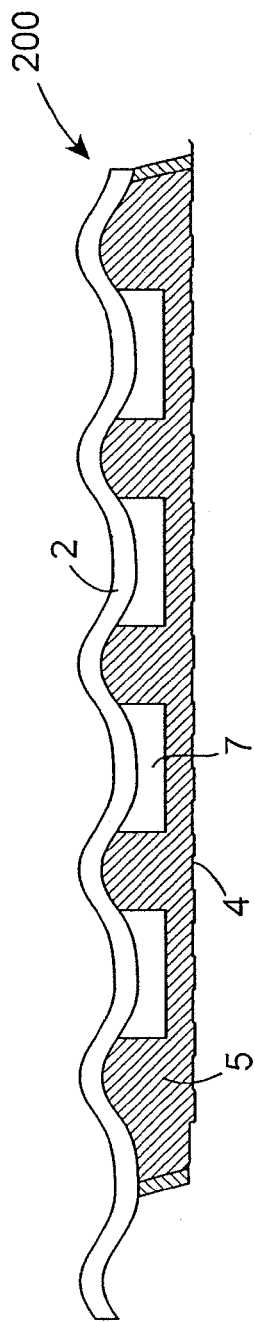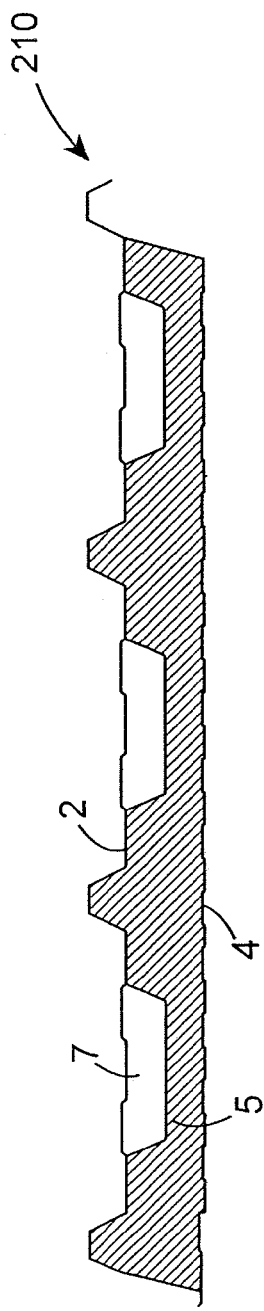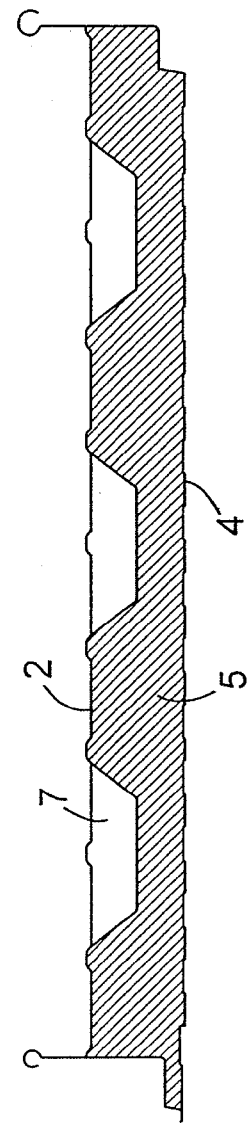

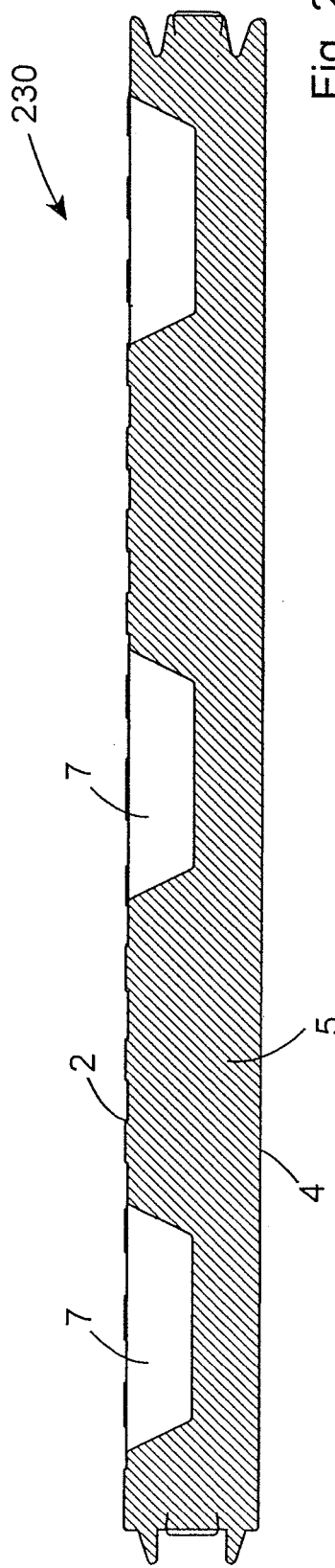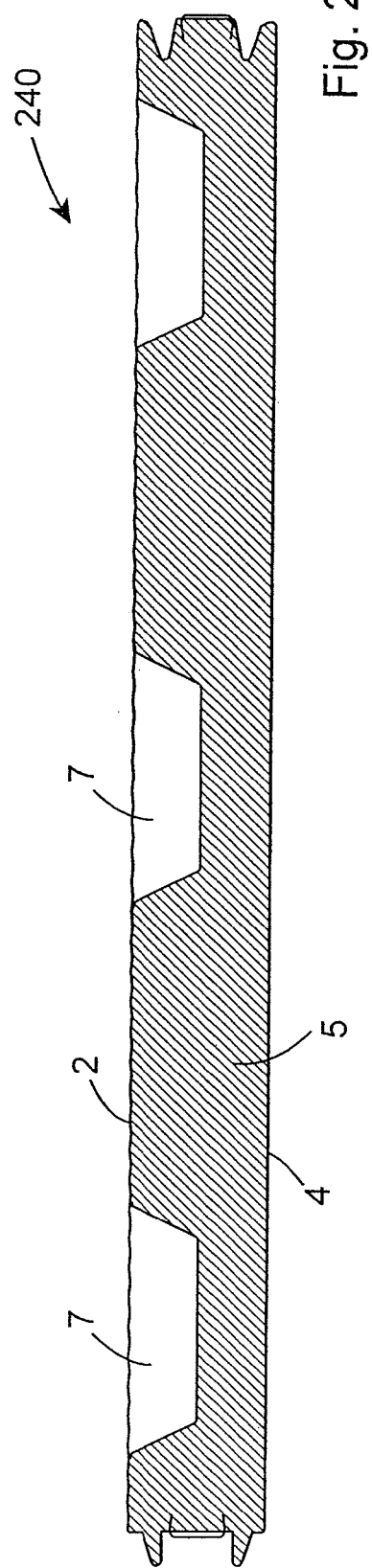

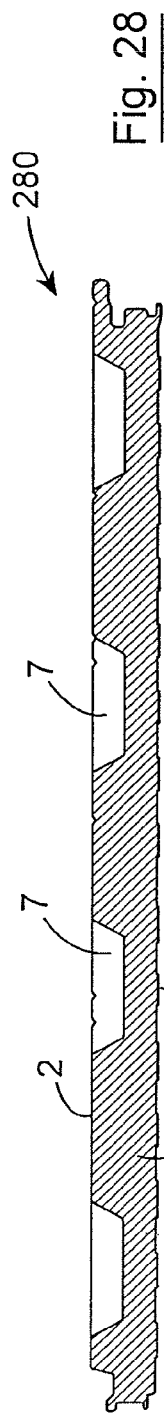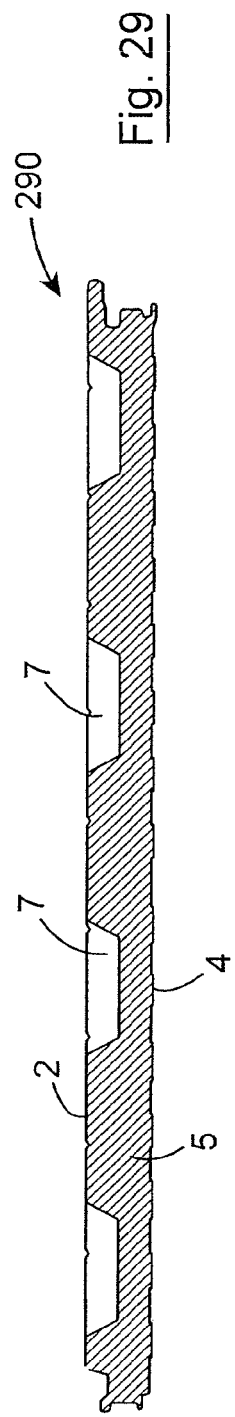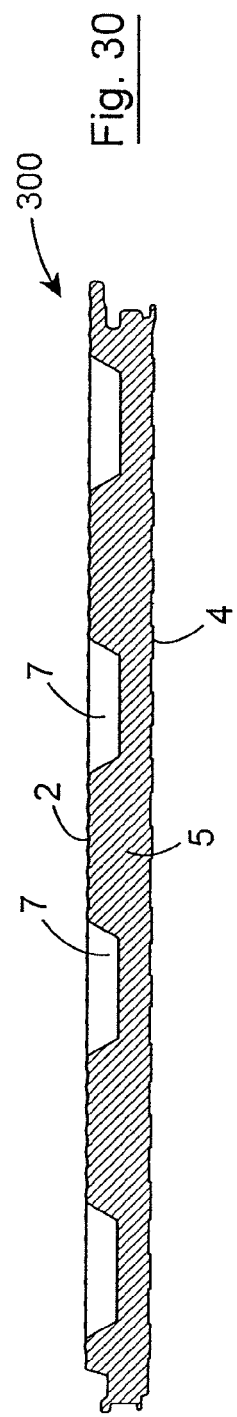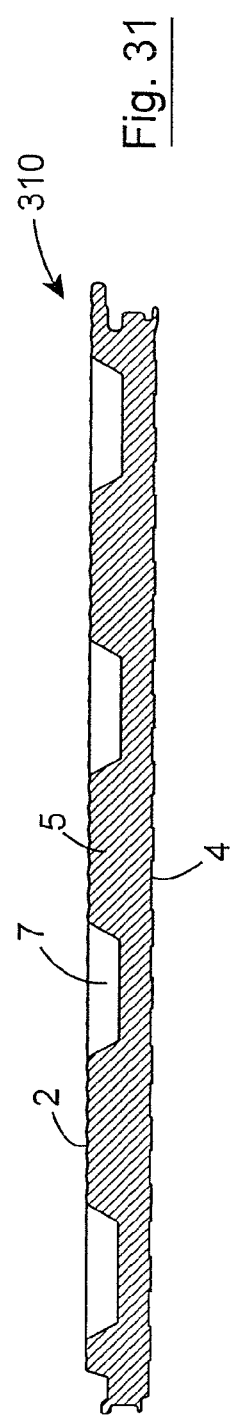

PANEL

This application is a Continuation application of U.S. patent application Ser. No. 12/076,191, filed Mar. 14, 2008, now U.S. Pat. No. 8,028,483, which claims priority to Irish application 2007/0324 filed May 1, 2007 and Irish application 2007/0446 filed Jun. 21, 2007, which is incorporated by reference herein.

INTRODUCTION

With increasing energy costs there is a need for optimizing heat transfer to and from a building.

This invention is directed towards providing an improved insulating panel which will address this issue.

STATEMENTS OF INVENTION

According to the invention there is provided a composite insulating panel comprising a first sheet, a second sheet, and insulating foam between the first sheet and the second sheet, the foam defining a longitudinally extending conduit means therein, a barrier between the conduit means and the insulating foam wherein the barrier is not planar.

In one embodiment the barrier comprises a pair of longitudinally extending transversely spaced-apart sides defining a plane therebetween and the barrier extends outside of said plane.

The barrier can extend into the foam.

The barrier can extend inwardly of the first sheet and/or inwardly of the second sheet.

In one embodiment the first sheet is profiled.

In another embodiment the second sheet is profiled.

In one embodiment the profile defines a profile recess and the recess forms part of the conduit means. The conduit means can be larger than the profile recess.

In one embodiment the conduit comprises the profile recess part and a foam recess part. The foam recess part can be oppositely directed with respect to the profile recess part.

In one case the foam recess part is of a shape which is substantially a mirror image of the profile recess part.

In one embodiment the first sheet comprises a plurality of longitudinally extending profiled crowns, at least some of the crowns refining the conduit means. One of the crowns can define an underlap for jointing with an adjacent like panel and the underlap crown can be filled with foam.

The barrier can comprise a membrane such as a foil or tape.

In one embodiment the panel comprises a plurality of the conduit means. Preferably between adjacent conduit means the foam is in direct contact with the sheet(s). Adjacent barriers may be spaced apart to provide regions for bonding of foam.

In another embodiment there is provided a composite insulating panel comprising a first sheet, a second sheet, and insulating foam between the sheet and the second sheet, the foam defining a longitudinally extending conduit means therein, a barrier between the conduit means and the insulating foam wherein the barrier extends into the foam.

In a further embodiment the invention provides a composite insulating panel comprising a first sheet, a second sheet, and insulating foam between the first sheet and the second sheet, the foam defining a longitudinally extending conduit means therein, a barrier between the conduit means and the insulating foam wherein at least one of the sheets is profiled, the recess forms part of the conduit means and the conduit means is larger than the profile recess.

In another embodiment the invention provides a composite insulating panel comprising a first sheet, a second sheet, and insulating foam between the first sheet and the second sheet, the foam defining a longitudinally extending conduit means therein wherein one of sheets comprises a plurality of longitudinally extending profiled crowns, at least some of the crowns defining the conduit means wherein one of the crowns defines an underlap for jointing with an adjacent like panel and the underlap crown is filled with foam. The panel may have The panel can be a roof panel, a wall panel, or a floor panel.

The invention also provides a heating or cooling system comprising a panel of the invention. The system can comprise duct means for collecting and directing air which is passing through the crown of the panel.

In one embodiment the system can comprise air circulating means for circulating air to or from the crown or duct.

The system can comprise a plurality of panels of the invention.

In another aspect the invention provides a method for manufacturing a composite insulating panel of the type comprising a first sheet, a second sheet, and an insulating foam body between the first and second sheets, the method comprising the steps of:

providing a first sheet;

providing a former on top of the first sheet;

laying liquid foam reactants down on top of the former and the first sheet;

placing a top sheet on top of the foam reactants;

allowing the foam to expand to substantially fill the space between the front sheet, the former and the second sheet; and removing the former from the foam to define a longitudinally extending conduit means in the foam.

In one embodiment the first and second sheets are moved along a bed.

In one case the former is static with respect to the bed.

The method can comprise the step of providing a barrier between the former and the liquid foam reactants. The barrier can, for example be a membrane such as a foil or tape.

The method can comprise the step of mounting the barrier to the first sheet.

The barrier can be bonded to the first sheet.

In one embodiment the method comprises shaping the barrier to the exposed profile of the former.

BRIEF DESCRIPTION OF THE DRAWINGS

The invention will be more clearly understood from the following description thereof given by way of example only, in which:

FIG. 2 is a cross sectional view of the panel of FIG. 1;

FIG. 2(*a*) is an enlarged view of a barrier used in the panel.

FIG. 2(*b*) is an enlarged view of a detail of the panel of FIGS. 1 and 2;

FIG. 8 is a cross sectional view of another panel according to the invention;

FIG. 9 is a cross sectional view on an enlarged scale of portions of the panel of FIG. 8;

FIG. 10 is a cross sectional view of a further panel according to the invention;

FIG. 11 is a cross sectional view on an enlarged scale of portions of the panel of FIG. 10;

FIGS. 12 to 31 are cross sectional views of various examples of panels according to the invention;

DETAILED DESCRIPTION

Figure 1:
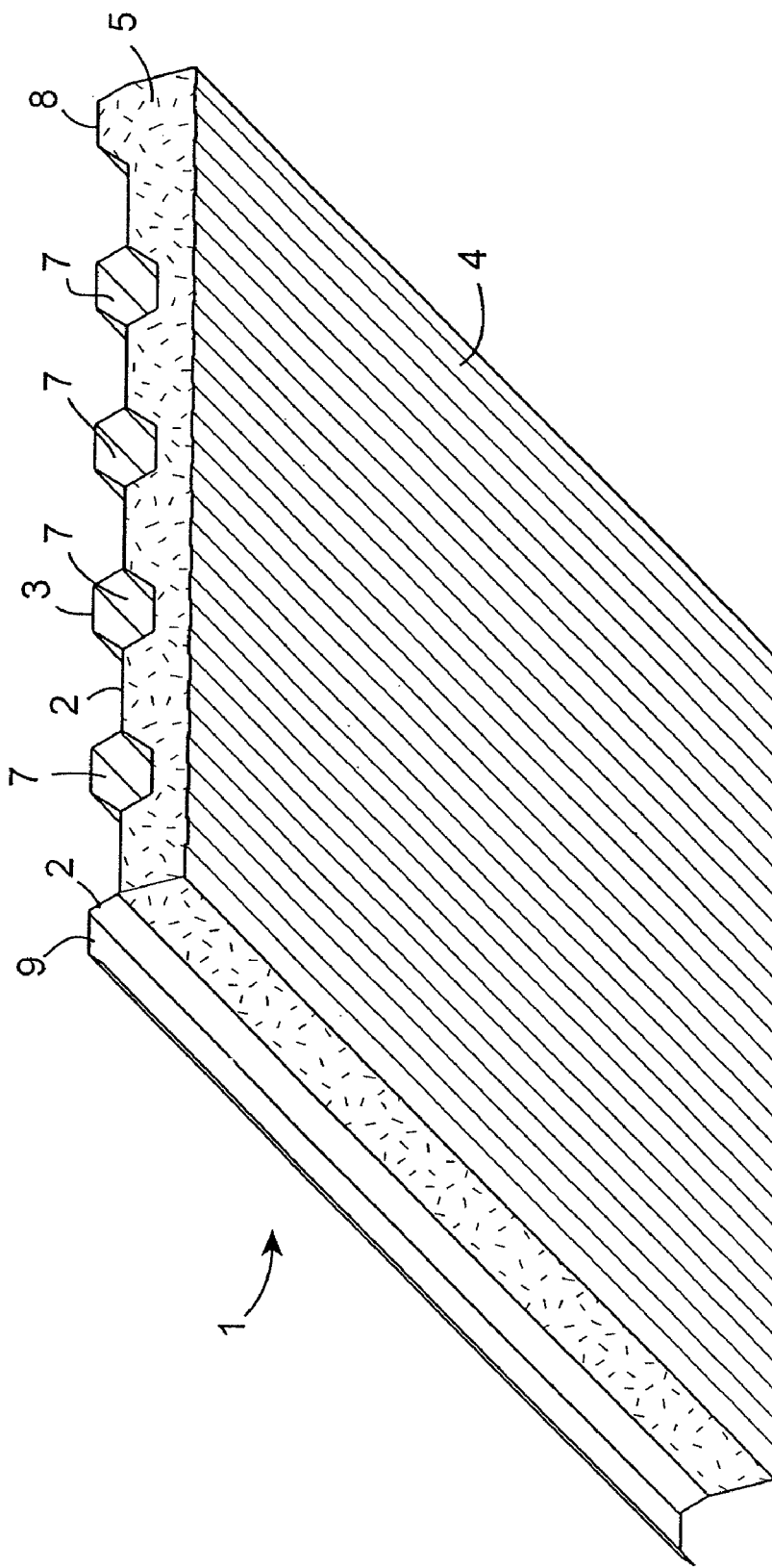
FIG. 1 is a perspective view of an insulating panel of the invention.

Referring to the drawings and initially to FIGS. 1 and 2 thereof there is illustrated an insulating panel 1 according to the invention comprising a first sheet 2, a second sheet 4 with an insulating body, in this case an insulating foam 5 therebetween. The foam may, for example be a polyisocyanurate foam or a phenolic foam. In this case the panel 1 is a roof panel 1 comprising a profiled external sheet 2 which may be of painted galvanized steel. The profile in this case comprises a plurality of projections, in this case raised crowns 3. The crowns 3 in this case are of generally trapezoidal form and extend longitudinally along the length of the panel. The panel also comprises an inner metal liner sheet 4.

The foam defines a plurality of longitudinally extending conduit means 7 through which a suitable heat exchange medium such as air is circulated. The panel thus has an integral heat collecting means provided in some of the crowns 3 of the external sheet which are devoid of insulation 5. The conduits 7 extend through the crowns 3 and air is circulated through the conduits 7. The conduits 7 run through the roof and/or wall in the external envelope of the building and the air absorbs solar energy. Conduits 7 may alternatively or additionally be provided in floor panels for heat circulation. The warmed air may be pumped back into the building to provide heat to the building space. Once the heated air passes through the building and transfers its energy, it may flow back to the conduit in the roof and/or wall and/or floor panels and the process may be repeated in a closed loop.

Barriers, in this case in the form of a membrane such as a tape or foil 10 are located below the crowns 3 to prevent foam entering the crowns 3 and in this case also to create additional foam-free voids below the crowns 3. This creates an enlarged void space through which air may be circulated to enhance the solar collecting efficiency of the panel. Referring in particular to FIGS. 2(*a*) the barriers 10 in this case have projecting side portions or legs 11 which may be attached, for example by adhesive to the inner face of the outer skin 3 of the panel. There is a free area 12 between individual barriers 10 to which the foam may directly bond to ensure direct foam bonding to the skin 3. The barriers 10 may be any suitable material such as foil or tape.

In the invention, the barrier 10 is not planar and can be used to define conduits of any desired size and/or shape. The barrier 10 has a pair of longitudinally extending transversely spaced-apart sides, 11 defining a plane therebetween and the barrier extends outside of said plane. The barrier can therefore be extended into the main body of the foam. The barrier can extend inwardly of the first sheet 2 and/or the second sheet 4 to provide a conduit of any desired size and shape. The first and/or second sheets may be profiled and at least some of the profile recesses may form a conduit. To increase the heat transfer capabilities the conduit may be larger than the recess defined by the profile of the sheet. There may be a foam recess part and a profile recess part of the conduit. These may be oppositely directed to enlarge the size of the conduit. In one case the foam recess part is of a shape which is substantially a minor image of the profile recess part.

It will be noted that the cross sectional area of the void space 7 created between the crowns 3 and the barriers 10 is relatively large for optimisation of air flow and heat transfer. Utilising barriers of different size, the void area can be adjusted to suit the particular requirements of a building.

Figure 3:
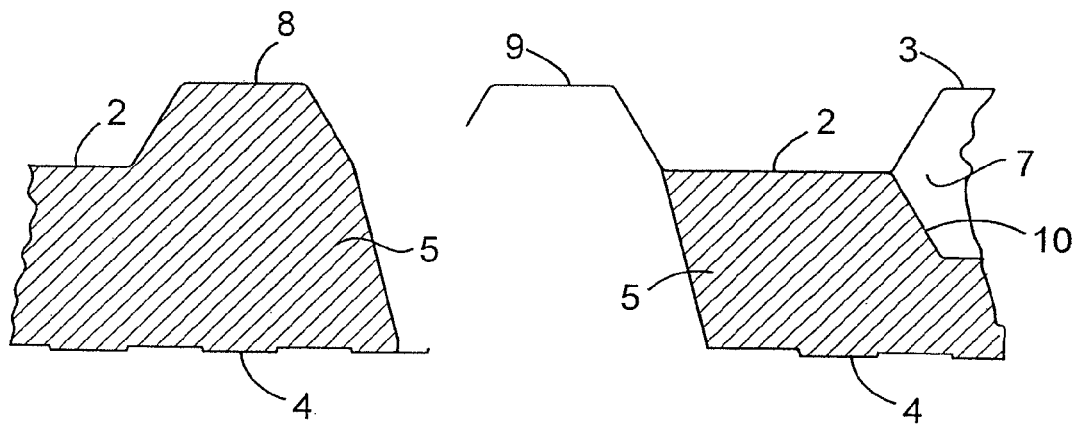
FIGS. 3 and 4 are cross sectional views of illustrating an overlap joint between adjacent panels of FIGS. 1 and 2.
Figure 4:
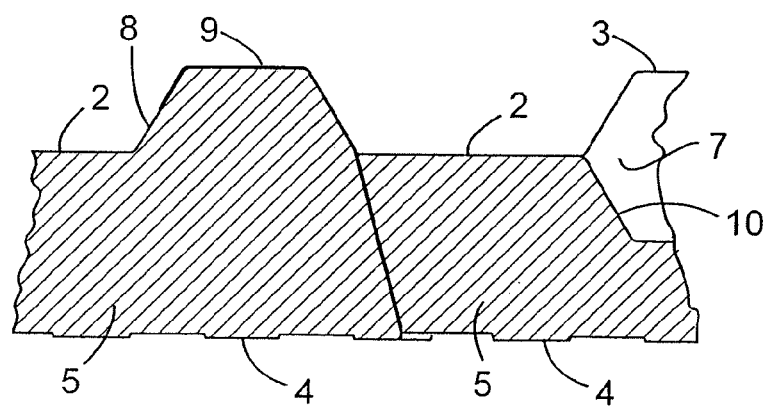

In this case an underlap crown 8 is filled with insulation foam so that when overlapped on assembly with an overlap hook 9 of an adjacent panel (see especially FIGS. 3 and 4), the panels at the joint can be readily jointed or stitched together. The compressive strength at the joint is enhanced.

Composite panels may be manufactured on a continuous production line by leading the outer sheet 2 along a flat bed with the recesses defined by the crowns 3 facing upwards. The sheet 2 may be of metal such as thin gague steel. The profiled sheet 2 is led to a lay-down area at which liquid foam reactants are spread across the sheet 2 using a lay-down poker or the like. As the foam rises a backing sheet is applied over the foam and the sandwich thus formed is then led through an oven and subsequently cut to length. The backing sheet 3 may be of metal such as thin gauge steel. The manufacturing technology is described in our UK-A-2227712, UK-A-2257086, and UK-A-2325640, the entire contents of which are herein incorporated by reference.

Figure 5:
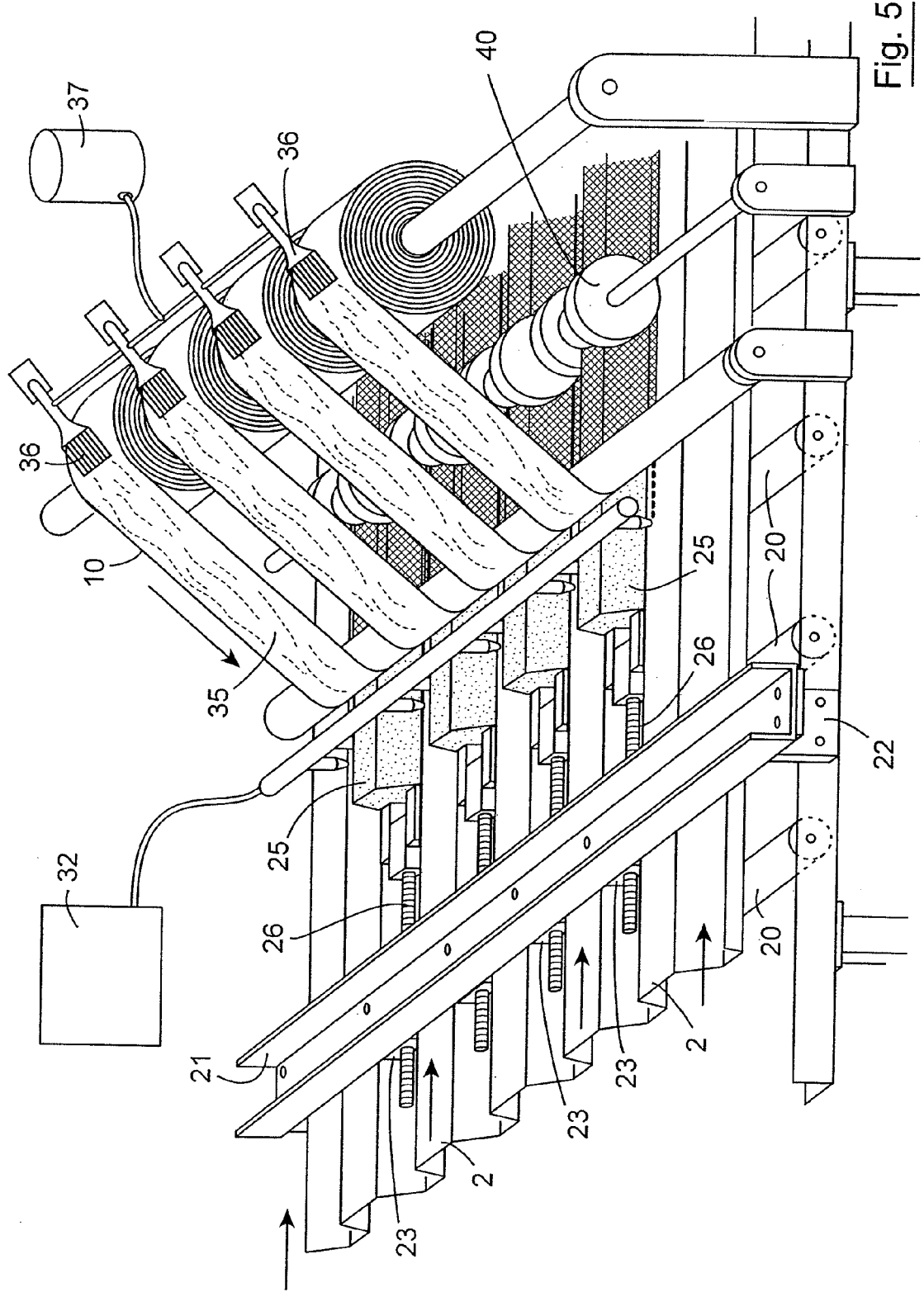
FIG. 5 is a perspective view of an apparatus used to manufacture panels of the invention.
Figure 6A:
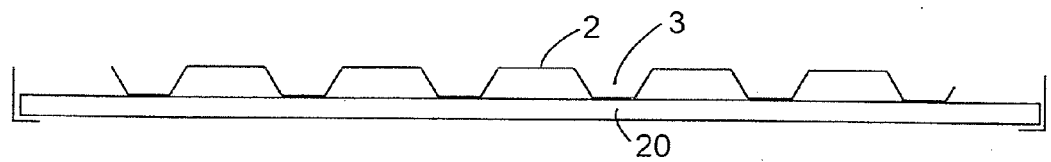
FIGS. 6(*a*) to 6(*e*) are cross sectional views illustrating various steps used in the manufacture of the panels.
Figure 6B:
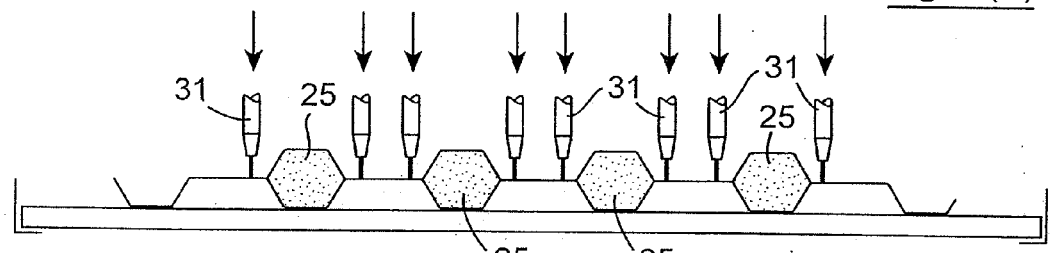
Figure 6C:
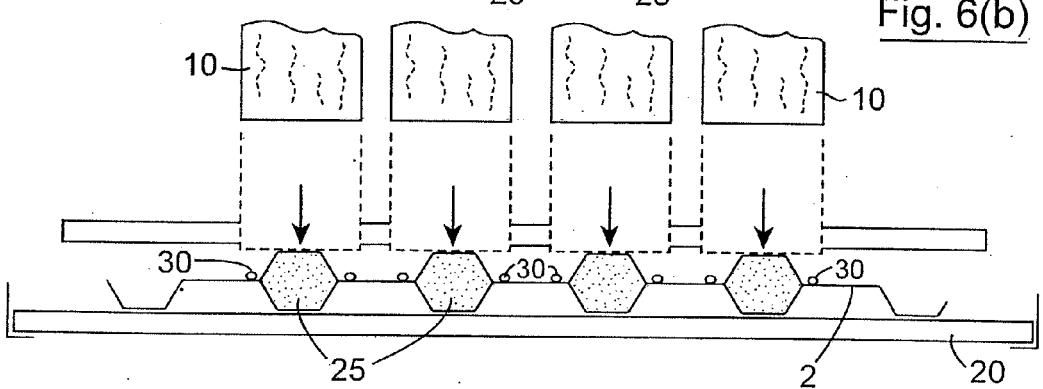
Figure 6D:
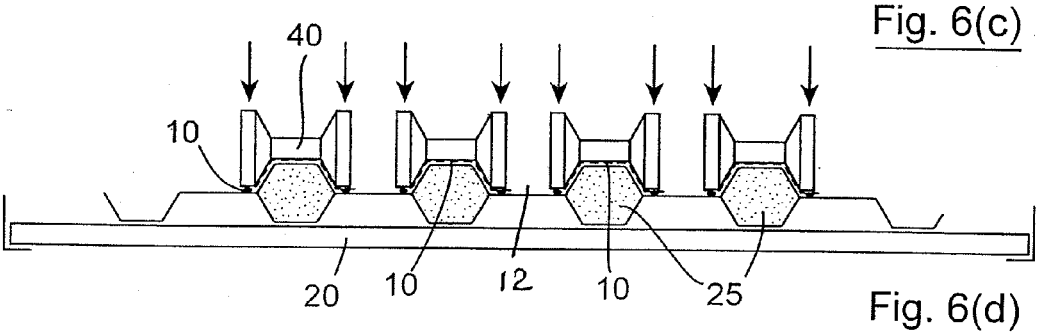
Figure 6E:
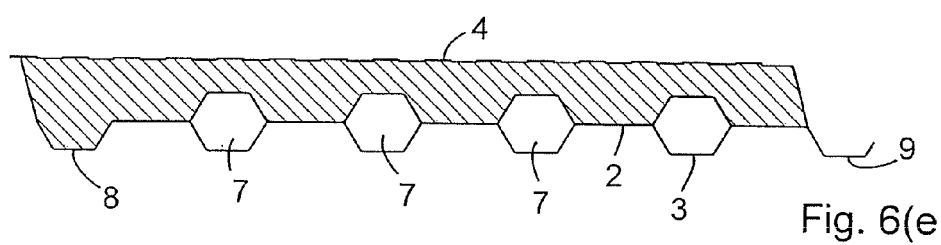
Figure 7A:
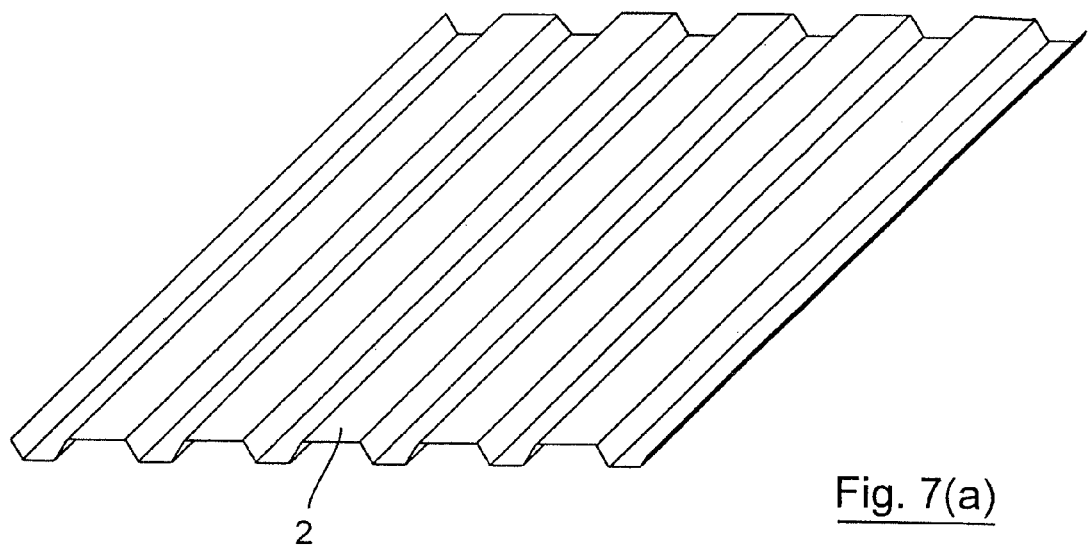
FIGS. 7(*a*) to 7(*c*) are perspective views of an external sheet part of a panel at various stages during the manufacturing process.
Figure 7B:
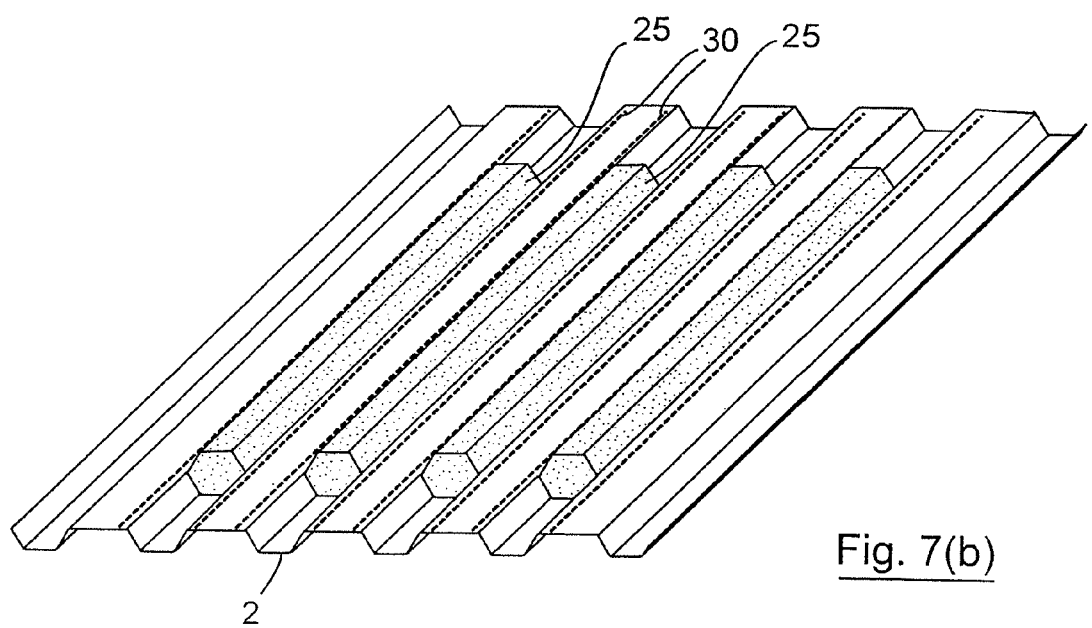
Figure 7C:
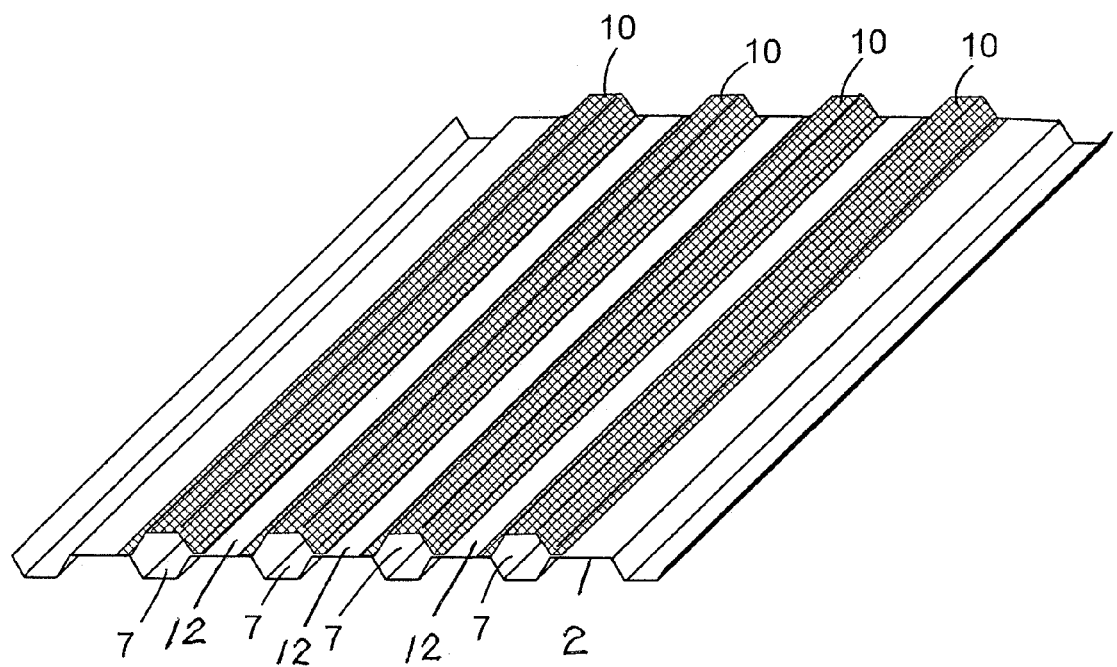
Figure 25:
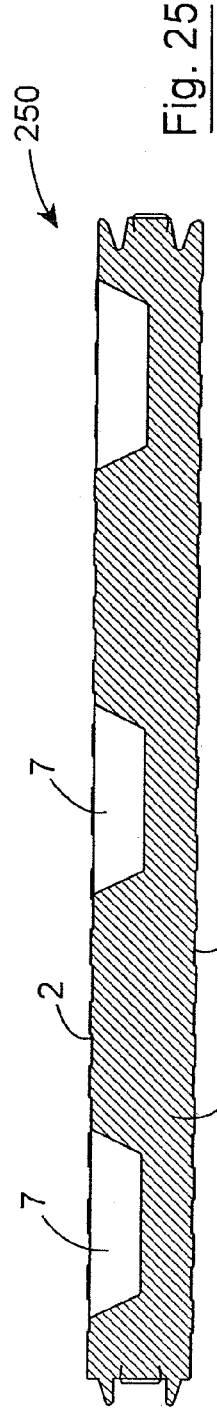
Figure 26:
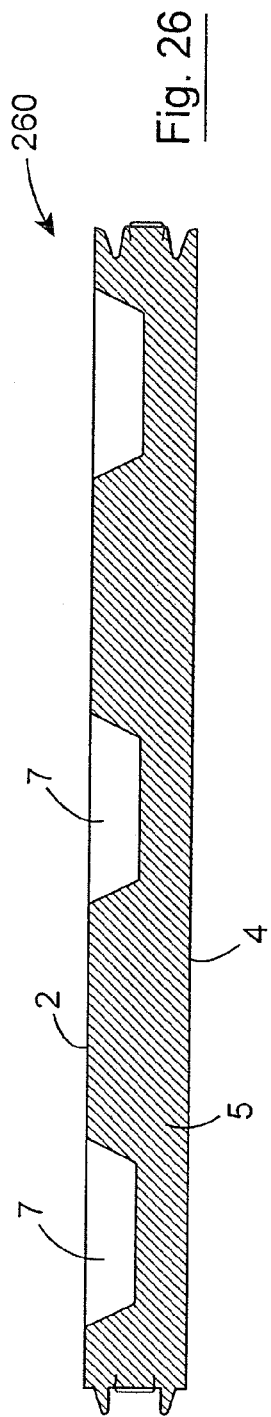
Figure 27:
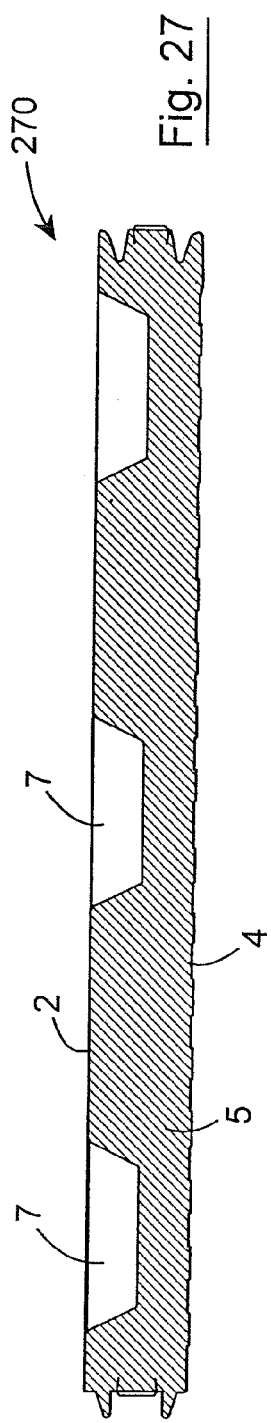

In the panels of the invention longitudinal conduit means 7 are defined by the foam. Referring in particular to FIGS. 5 to 7 a panel according to the invention is manufactured by leading an external sheet 2 along a flat bed defined by a conveyor having rollers 20. A transverse support 21 is mounted by brackets 22 above the bed. In this case, four anchor blocks 23 are mounted to the support 21 and a former 25 is mounted to each block 23 by screw threaded rods 26. The longitudinal extent of a former 25 may be adjusted by moving the rod 26 relative to the associated anchor block 23. The formers 25 remain static with respect to the moving profiled sheet 2. Barriers which in this case comprise foil strips 10 are applied over the formers 25 and in this case are bonded to the inside face of the sheet 2 on each side of the profiled recess. Adhesive 30 is applied to the inner sheet face by nozzles 31 which are supplied from a supply tank 32. In this case a suitable lubricant 35 is applied to the underside of the barrier strips 10 by brushes 36 supplied from a supply tank 37. The lubricant assists the movement of the barrier strips 10 on the static formers 25.

Shaping rollers 40 shape the strips 10 to conform with the exposed profile of the formers 25.

After application of the strips 10 over the formers 25, liquid foam reactants are laid down over the applied barrier strips 10 and the upper face of the sheet 2. A backing sheet 4 is applied and the foam is allowed to expand to fill the space between the sheet 2, barriers 10 and the sheet 4. In this case, the formers 25 only extend for a length sufficient to allow the foam to at least partially set whilst supporting the barrier 10. The panel with the conduit means defined in the foam continues through an oven to cure the foam. The panels may then be cut to a desired length and various further operations may be performed.

The formers 25 may be of any size and shape and may be located anywhere along a sheet 2 (whether profiled or not). Thus, the method can be utilized to produce a very wide range of panels, including those illustrated by way of example in FIGS. 8 to 31. The panels of FIGS. 8 to 31 are similar to those of FIGS. 1 and 2 and like parts are assigned the same reference numerals.

The panel 100 of FIGS. 8 and 9 with two conduits 101 will have the ability to collect and circulate energy but will not be as efficient as the panel of FIGS. 1 and 2.

The panel 110 of FIGS. 10 and 11 is similar to that of FIGS. 1 and 2. In this case the panel has engagement formations in the form of recesses 111 and projections 112 for engagement of adjacent like panels. Interengagement features may be provided on any of the panels of the invention.

The panels of the invention may or may not have projections/crowns on their external face. These projections/crowns may or may not be used to provide conduits 7. Using the technology of the invention conduits 7 may be provided in any desired shape at any desired location of the panel.

In the panel 120 of FIG. 12 and the panel 130 of FIG. 13 conduits 7 extend inwardly from the face of the external sheet of the panel. Because the face against which solar energy impinges is generally flat the collection efficiency is likely to be diminished.

The panel 140 of FIG. 14 is similar to that of FIG. 2 except that the crowns/projections 141 are of curvilinear—such as accurate—shape. In the panel 150 of FIG. 15 the crowns/projections 151 are of triangular shape.

The panels 160, 170, 180, 190, of FIGS. 16 to 19 are of similar profile and are generally flat with external sheets 2 and/or internal sheets 4 with or without small formations such as microribs.

Referring to FIG. 20, in this case a panel 200 is a roof tile panel with an external sheet of undulating or corrugated form. Panels of this type are described in UK-A-2384500. The panels 210 and 220 of FIGS. 21 and 22 respectively are roof panels of different types incorporating conduits 7.

The panels 230 to 310 of FIGS. 23 to 31 respectively again illustrate the application of the invention to a wide range of panel types with different joint details and/or internal sheet and/or external sheet detailing/profiles.

Figure 32:
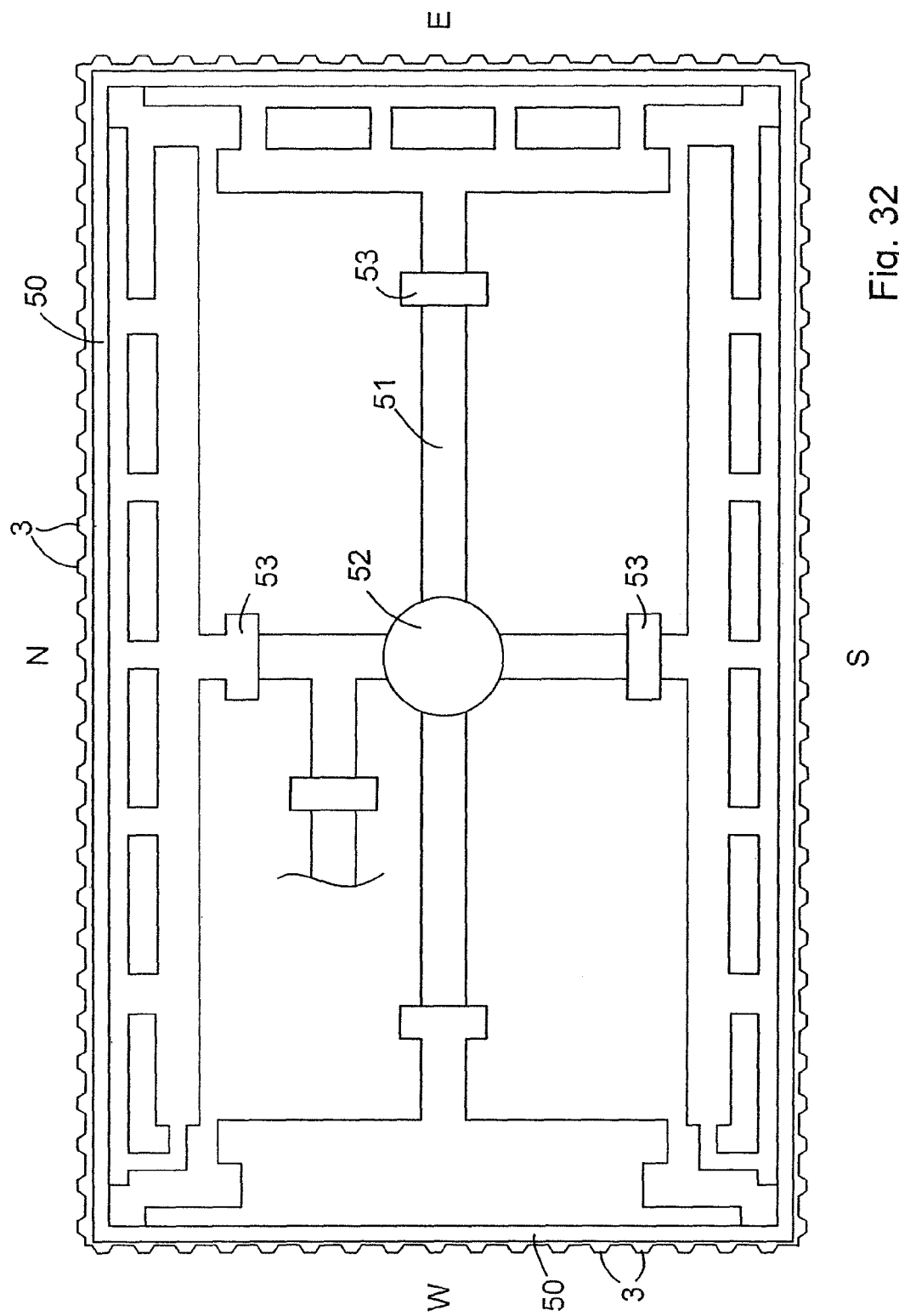
FIG. 32 is a plan cross sectional view of building comprising a plurality of panels of the invention.
Figure 33:
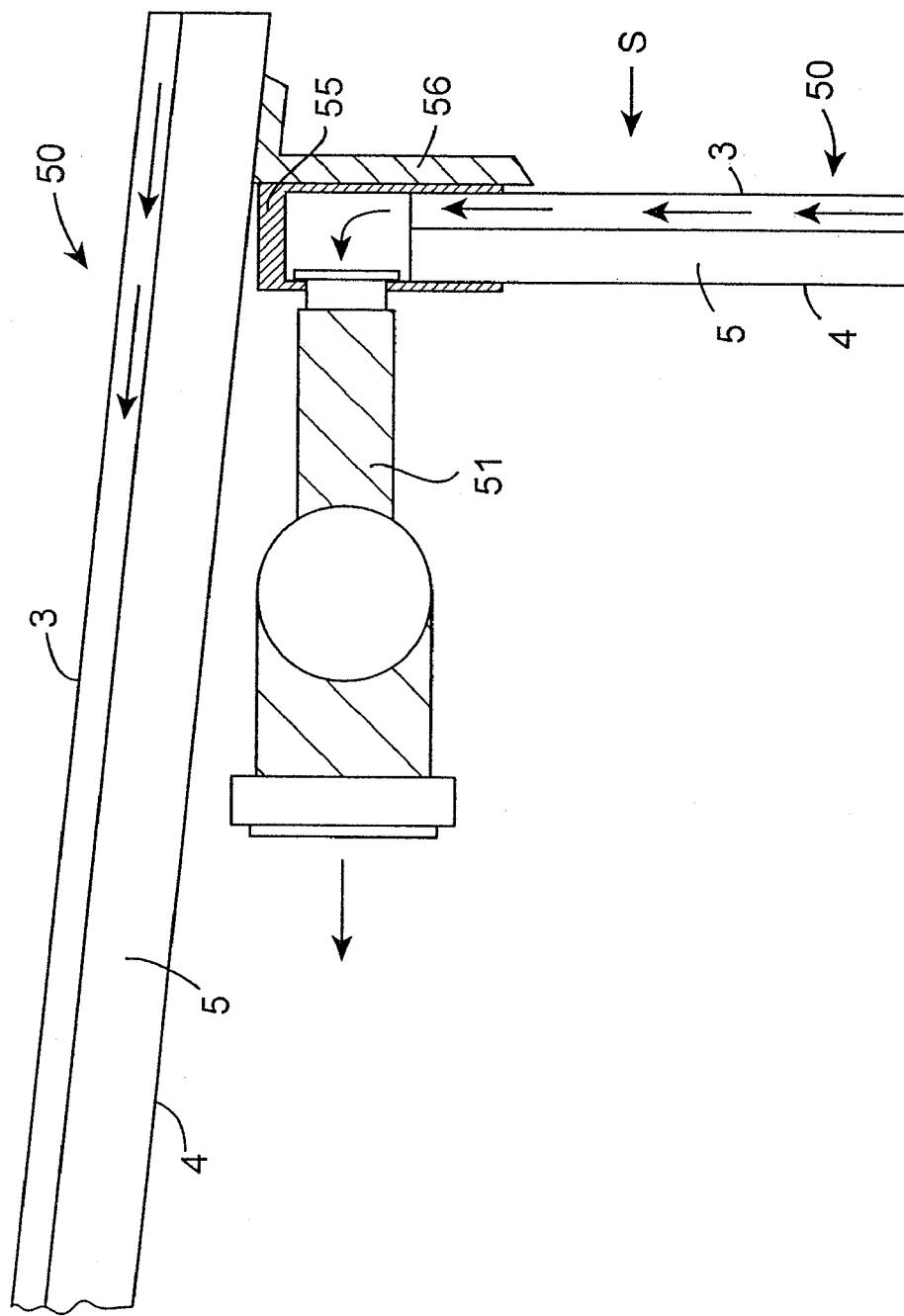
FIG. 33 is a cross sectional view of a top corner of the building of FIG. 32.
Figure 34:
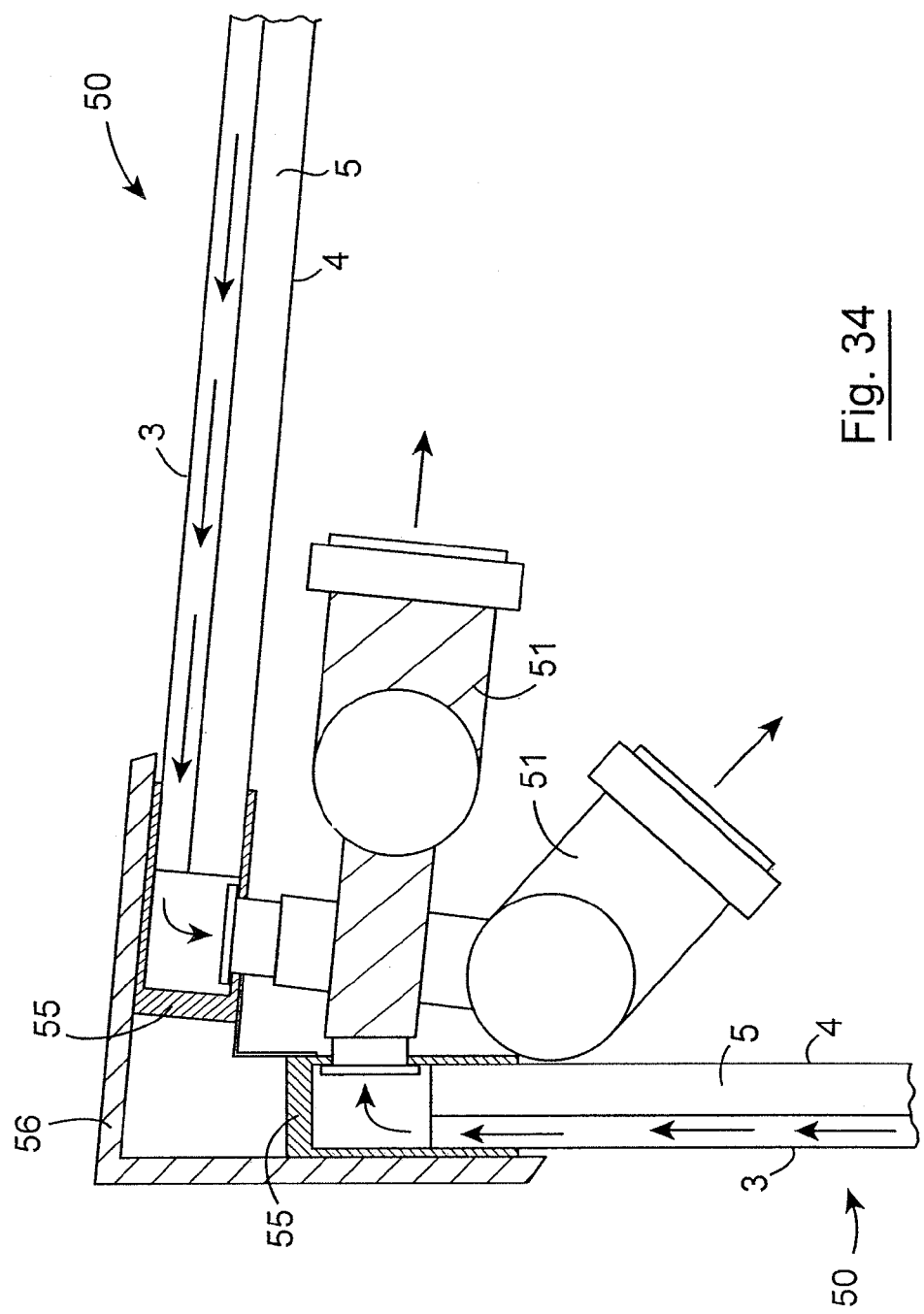
FIG. 34 is a cross sectional view of another corner of the building of FIG. 33.

The panels may be used to construct part of or all of the building envelope including the roof, walls and floor. One such building is illustrated in FIGS. 32 to 34. Each of the walls and the roof of the building comprise a plurality of the panels 20. Air circulating through the conduit means defined by the foam is directed into ducting 51. The flow or air may be controlled using one or more fans 52. The ducting may have venting system 53 which may be motorized to facilitate ease of operation and control. The circulating air is again heated by solar energy. This hot air is captured and may be passed into the heating/ventilation ductwork of the building, again assisting in heating the building. The heated air may also or alternatively be circulated through a heat exchanger for transfer of solar heat to another heat collector. The system may be set to take air from the warmest or coldest elevations depending on the internal and external temperatures. The system can be used for heating and/or cooling.

Referring especially of FIGS. 33 and 34 suitable insulated cappings 55 may be provided. The building may also have insulated flashings 56.

EXAMPLES

We have found that the panel of FIG. 2 is particularly suitable for roofs, walls and for floors. The panel has a large exposed surface area and a high large internal void space whilst maintaining structural and insulation properties. The width L of the panel in this case is 1 meter. For optimum thermal efficiency there may be at least three and preferably at least four crowns 3. Each of the crowns 3 defines an area which is devoid of foam.

Referring to FIG. 2(b) the faces that are exposed to the external environment comprise an outer face x and two side faces which diverge inwardly from the outer face x. The angle a between the faces x, y is preferably 115° to 125°, most preferably 118° to 123° and in this case about 121°.

The width w1 of the exposed face x is from 50 mm to 60 mm, most preferably in this case about 54 mm. The height h1 is from 30 mm to 40 mm, in this case about 36 mm. The total cross sectional area above the dashed line in FIG. 2(b) is about 0.002906 m². In this case the cross sectional area is further enlarged by providing an additional recessed section extending into the foam. This additional section has an inner face v and side faces z of which diverge outwardly from the inner face v. The angle α between the faces v and z is preferable 115° to 125°, most preferably 118° to 123°, and in this case about 120°.

The inner face v has a width w2 that may be from about 50 mm to about 100 mm, preferably about 65 mm to 75 mm, in this case about 70 mm.

The maximum width w3 of the cavity is in this case about 80 mm to 120 mm, preferably about 90 mm to 110 mm and in this case about 97 mm.

The depth h2 of the recessed section is typically from 10 mm to 40 mm, preferably 20 to 35 mm, and in this case about 27 mm.

The cross sectional area of the recessed section below the dashed line is about 0.00236 m².

The total cross sectional area of the cavity (void area) is 0.002906+0.00236=0.005266 m²

The efficiency is calculated based on an air velocity through the cavity of 4.3 m/s, operating through an elevation of 6 m×100 m.

The ASHRAE Standard 93-2003-equation for efficiency of a solar collector $$\eta = \frac{m \cdot c_p \cdot \partial T}{A \cdot I}$$

Test data generated using the panel of FIG. 2 indicates an approximately 9.5 deg C. air temp rise at 500 W/m²

| | | |
|---|---|---|
| Mass | m | 11 kg |
| Specific heat capacity | $c_p$ | 1012 J/kgK |
| Temperature differential | ΔT | 9.5° C. |
| Collector Area | A | 349.8 m² 0.583 m² collector area per m² |
| Irradiance | I | 500 W/m² |
| Efficiency | η | 0.60 |

The energy production possible the panel was calculated using RETscreen International Clean Energy Project Analysis software available at www.retscreen.net. The following assumptions were made:

Building Location: North West England
Building Size: 10 m×100 m×100 m=10,000 m² floor space.
South Facing Wall: 100 m (W)×10 m (H)
Fan Air Speed: 7 m/sec.
Using the panels of FIGS. 1 and 2 to construct the south facing wall of the building and circulating air through the foam-free passageways results in the following energy production:

Renewable heating energy delivered in one year 183.08 MWhrs based on local wather data.

Many variations on the embodiments described will be readily apparent. Accordingly the invention is not limited to the embodiments hereinbefore described which may be varied in detail.

The invention claimed is:

1. A method for manufacturing a composite insulating panel of the type comprising a first sheet, a second sheet, and an insulating foam body between the first and second sheets, the method comprising the steps of:—
   providing a first sheet;
   providing a former on top of the first sheet;
   laying liquid foam reactants down on top of the former and the first sheet;
   providing a barrier membrane between the former and the liquid foam reactants;
   placing a top sheet on top of the foam reactants;
   allowing the foam to expand to substantially fill the space between the front sheet, the former and the second sheet; and
   removing the former from the foam to define a longitudinally extending conduit means in the foam.

2. The method as claimed in claim 1 wherein the first and second sheets are moved along a bed.

3. The method as claimed in claim 2 wherein the former is static with respect to the bed.

4. The method as claimed in claim 1 wherein the barrier membrane comprises a foil or a tape.

5. The method as claimed in claim 1 comprising the step of mounting the barrier membrane to the first sheet.

6. The method as claimed in claim 5 wherein the barrier is bonded to the first sheet.

7. The method as claimed in claim 1 comprising shaping the barrier to the exposed profile of the former.

8. The method for manufacturing a composite insulating panel, said method comprising
   providing a first sheet having an inner surface and an outer surface;
   providing a second sheet having an inner surface and an outer surface; and
   wherein at least one of the sheets includes at least one outwardly directed raised projection which extends longitudinally along a length of the panel, the projection having an internal open mouth;
   inserting a former into the open mouth of the projection;
   laying liquid foam reactants down on top of the former and the first sheet;
   providing a barrier membrane between the former and the liquid foam reactants;
   placing a top sheet on top of the foam reactants;
   allowing the foam to expand to substantially fill the space between the front sheet, the former and the second sheet to form an insulating foam core extending from an inner surface of the first sheet to an inner surface of the second sheet; and
   removing the former from the foam to define a longitudinally extending conduit means in the foam.

9. The method as claimed in claim 8 wherein the barrier comprises a first longitudinally extending side portion and a second longitudinally extending side portion and the method comprises placing the first longitudinally extending side portion of the barrier on one side of the internal month of the projection and placing the second longitudinally extending side portion of the barrier on an opposite side of the internal mouth of the projection.

10. The method as claimed in claim 8 wherein the first and the second sheets are moved along a bed.

11. The method as claimed in claim 8 wherein the former is static with respect to the bed.

12. The method as claimed in claim 8 wherein the barrier membrane comprises a foil or a tape.

13. The method as claimed in claim 8 comprising the step of mounting the barrier membrane to the first sheet.

14. The method as claimed in claim 13 wherein the barrier is bonded to the first sheet.

15. The method as claimed in claim 8 comprising shaping the barrier to the exposed profile of the former.

* * * * *